Aug. 1, 1961        L. R. ZUMWALT         2,994,656
            FUEL ELEMENT CONSTRUCTION
              Filed Dec. 31, 1958
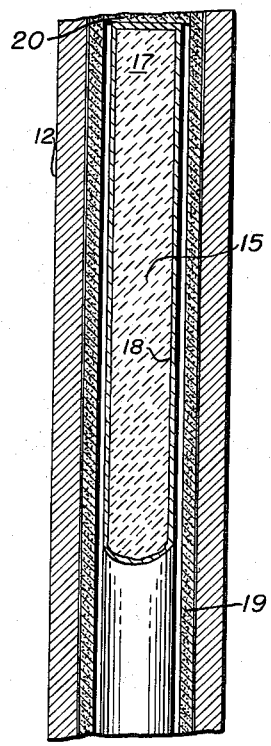
                                    INVENTOR
                            LLOYD ROBERT ZUMWALT
                         BY
                                   ATTORNEY

United States Patent Office 2,994,656
Patented Aug. 1, 1961

2,994,656
FUEL ELEMENT CONSTRUCTION
Lloyd Robert Zumwalt, La Jolla, Calif., assignor, by mesne assignments, to the United States of America as represented by the United States Atomic Energy Commission
Filed Dec. 31, 1958, Ser. No. 784,067
4 Claims. (Cl. 204—193.2)

The present invention relates generally to the construction of fuel elements for use in nuclear reactors and, more particularly, to means for retaining volatile fission products within the fuel element.

One form of fuel element for a nuclear reactor comprises a body or compact of fissile material or a mixture of fissile and fertile materials together with various other substances which are enclosed in one or more containers which are adapted to prevent the escape of fission products. In addition, a fission product trap which is connected to the fuel element may be provided for trapping any fission products which escape from the containers for the fuel body.

The problem of containing volatile fission products is especially serious in connection with a high temperature reactor wherein graphite or carbon is employed as the container for the fuel material. In one particularly desirable form of construction of a fuel element of this type, the body or compact of fuel is enclosed in a highly impervious graphite container which is fitted with a closure which is brazed or otherwise fastened in place to provide a substantially gas-tight seal. The graphite container enclosing the fuel body is then disposed within an outer sleeve or container of graphite, the combination of the graphite containers and the fuel body comprising the fuel element. Since the present day reactor-grade so called "impermeable graphites" have a substantial percentage of pore volume (and a large number of these pores are interconnected), they are still somewhat permeable. Thus, volatile fission products have a tendency to migrate through the inner container into the space between the sleeve and the container and thence through the sleeve into the coolant. In order to provide a less porous graphite, various techniques have been employed to decrease its permeability. For example, the surface of the graphite has been coated with a relatively impervious substances such as pyrolytic carbon which serves to fill the surface pores so as to minimize the passage of volatile materials through the graphite wall. In addition to coating or otherwise rendering the graphite more impermeable, fission product traps are employed to draw off and trap the fission products from the space between the inner and outer containers. Despite the efforts which have been made, however, the volatile fission products still have a tendency to migrate through graphite walls and contaminate the coolant.

Accordingly, it is an object of this invention to obviate or minimize the prior art problems of the migration of the volatile fission products from the fuel body and through the walls of the container. A more specific object of the invention is to provide a means for converting the volatile fission products into a stable, relatively non-volatile form whereby they will tend to stay within a predetermined area.

Other objects and advantages of the invention will become known from reference to the following drawing and description of the invention, the drawing being a schematic, fragmentary cross section of a fuel element in accordance with the present invention.

Basically, the invention comprises a method of converting volatile or diffusible fission products into stable, less volatile or less diffusible forms whereby they will tend to remain within the area defined by the fuel element containers. This is accomplished by disposing a conversion material in a position where it will react with certain of the volatile and diffusible fission products. The conversion material comprises a compound having a low neutron cross section which reacts with various of the diffusible metallic fission products to convert them into a molecular form which has a lower volatility and lower diffusibility and which will therefore less readily tend to migrate through the walls of the containers.

The conversion material which accomplishes the conversion and immobilization of the volatile fission products may be disposed within the fuel body itself as by dispersing it through the compact which contains the fuel element, it may be employed as a coating on the fuel body as shown in the figure, it may be disposed in or on walls of the fuel container, it may be disposed in the walls of the fuel sleeve or as a coating on its inner surface, or it may even be disposed in the region between the fuel container and the inner walls of the sleeve or the region between the fuel body and the fuel container. In short, the conversion material may be disposed in any manner or in any position in which it will react with and immobilize volatile or diffusible fission products before they reach the coolant of the reactor system.

The conversion material employed which, as has been pointed out, is a material of low neutron cross section, is an inorganic compound which is stable and has low volatility and diffusibility at the temperatures obtaining within the fuel element. Suitable conversion materials include a metallic element in one of its higher states of oxidation combined with a non-metallic element capable of combining with the volatile fission products to be immobilized and forming a compound having a volatility and diffusability at the temperature obtaining within the fuel element lower than that of the fission products to be immobilized. Thus, when the diffusible metallic fission products migrate into contact with the conversion material, they will react with the non-metallic element of the material to produce a compound of lower diffusibility and volatility than the metallic fission product and at the same time will reduce the state of oxidation of the metallic element in the conversion material.

In reactor systems the elements strontium, cesium, barium, rubidium, and the rare earth metals all cause concern because they are quite volatile and/or diffusible. These materials are extremely difficult to confine and despite most precautions they will tend to migrate from the fuel body. Conversion materials which are especially reactive with these materials are the fluorides of metallic substances, the particular fluoride compound being selected, of course, to provide a low neutron cross section. The compound should have high melting and boiling points and a low enough vapor pressure and diffusibility so that they will exist in a relative stable condition over an extended period of time in a fuel element. One fluoride which is particularly satisfactory is lead difluoride. This fluoride has a low neutron cross section and is particularly reactive as a fluorinating agent. Other fluorides which are useful are cerium tetrafluoride, zirconium trifluoride, iron difluoride, and chromium difluoride. All of these materials have high melting and boiling points and low neutron cross sections and are capable of existing in a fuel element over a period of years. These conversion materials will react with the vapors of strontium, cesium and other fission products mentioned above to form the fluorides of the fission products, which fluorides have a substantially lower diffusibility than the fission products themselves. The metallic element in the conversion material is reduced to a point where it is combined with fewer fluorine atoms as in the case of the lead difluoride which is reduced to lead monofluoride, the cerium tetrafluoride is reduced to the trifluoride, the zirconium trifluoride is reduced to the difluoride, and the iron and chromium difluorides are reduced to the metals which in turn will be carburized in situ.

One particularly efficient manner of utilizing the conversion material is to disperse it as a coating on the outer surface of the fuel body or compact, or as a coating in the interior of the fuel container. In a fuel compact containing about 35 grams of uranium-235 and about 180 grams of thorium, between about 10 and 50 grams of the above reagents (lead difluoride, cerium tetrafluoride and zirconium trifluoride, iron difluoride and chromium difluorides or combinations thereof) is sufficient to combine with the volatile fission products produced over a three-year burn up period.

In the accompanying schematic drawing, a portion of a solid fuel element 17 in accordance with the present invention is illustrated, which fuel element includes a solid fuel body or compact 15 which may comprise a mixture of fissile and fertile materials. On the outer surfaces of the fuel body 15 is disposed a coating 18 of conversion material, i.e., at least one material selected from the group consisting of lead difluoride, zirconium trifluoride, cerium tetrafluoride, iron difluoride and chromium difluoride. The coated fuel body is enclosed in a highly impervious graphite container 19 fitted with a top closure 20 brazed in place to provide a substantially gas-tight seal. The graphite container enclosing the fuel body is disposed within an outer sleeve or container 12 of graphite.

As has been pointed out above, the conversion material may also be dispersed in the fuel body or compact or within the walls of the fuel container or outer sleeve. If the conversion material is dispersed in the fuel body or in a carbon structural member care should be taken that the strength of the body or carbon member is not weakened or that its density is not lowered sufficiently to cause difficulties. The conversion material may also be positioned in the spaces between the fuel container and the outer confining sleeve, or on the fuel body and fuel container.

The provision of the conversion material in the fuel element construction materially reduces the amount of volatile and diffusible fission products which escape from the fuel element and thus simplifies the problem of removing fission products from a reactor coolant.

Various features of the invention which are believed to be new are set forth in the appended claims.

I claim:

1. A solid fuel element for a nuclear reactor including a solid fuel body, a solid container unit disposed about said fuel body to isolate said fuel body from coolant in the reactor, said container unit comprising at least one container, a conversion material solid at the reactor operating temperature and of low neutron cross section disposed inwardly of the outermost surface of said container unit, said conversion material consisting of at least one fluoride selected from the class consisting of lead difluoride, zirconium trifluoride, cerium tetrafluoride, iron difluoride, and chromium difluoride, whereby strontium and cesium fission products react with said fluoride conversion material to reduce the same and to form strontium fluoride and cesium fluoride stable, together with the reduced form of conversion material, at the fuel element operating temperature.

2. A solid fuel element for a nuclear reactor including a solid fuel body, a graphite container unit disposed aobut said fuel body to isolate said fuel body from coolant in the reactor, said container unit comprising at least one container, and a conversion material solid at the reactor operating temperature and of low neutron cross section disposed inwardly of the outermost surface of said container unit, said conversion material consisting of lead difluoride whereby strontium and cesium fission products react with said fluoride conversion material to form strontium fluoride, cesium fluoride and lead monofluoride, stable against migration at the fuel element operating temperature.

3. A solid fuel element for a nuclear reactor including a solid fuel body comprising a mixture of fissile and fertile materials, a graphite inner container disposed about said fuel body to isolate said fuel body from coolant in the reactor, a graphite outer container disposed around said inner container, and a conversion material solid at the reactor operating temperature and of low neutron cross section disposed within said inner container, said conversion material being at least one fluoride selected from the class consisting of lead difluoride, zirconium trifluoride, cerium tetrafluoride, iron difluoride, and chromium difluoride whereby strontium and cesium fission products react with said fluoride conversion material and reduce the same to form strontium fluoride, cesium fluoride and reduced fluoride conversion material, stable at the fuel element operating temperature.

4. A solid fuel element for a nuclear reactor including a solid fuel body comprising a mixture of fissile and fertile materials, a graphite inner container disposed about said fuel body to isolate said fuel body from coolant in the reactor, a graphite outer container disposed around said inner container, and a conversion material solid at the reactor operating temperature and of low neutron cross section disposed within said inner container, said conversion material being lead difluoride whereby strontium and cesium fission products react with said lead difluoride to form strontium fluoride, cesium fluoride and lead monofluoride, stable at the fuel element operating temperature.

References Cited in the file of this patent

UNITED STATES PATENTS

| | | |
|---|---|---|
| 2,758,023 | Baries | Aug. 7, 1956 |
| 2,816,042 | Hamilton | Dec. 10, 1957 |
| 2,818,605 | Miller | Jan. 7, 1958 |
| 2,852,460 | Abbott et al. | Sept. 16, 1958 |
| 2,853,446 | Abbott et al. | Sept. 23, 1958 |

FOREIGN PATENTS

| | | |
|---|---|---|
| 754,559 | Great Britain | Aug. 8, 1956 |

OTHER REFERENCES

Nucleonics, March 1956, pp. 34–41.
NAA–SR–2047, October 1, 1957.